United States Patent [19]

Stefan

[11] Patent Number: 4,976,565
[45] Date of Patent: Dec. 11, 1990

[54] DRAW BOLT APPARATUS FOR COUNTERTOP ASSEMBLAGE

[76] Inventor: Alexander Stefan, 216 E. Arby Ave., Las Vegas, Nev. 89119

[21] Appl. No.: 536,320

[22] Filed: Jun. 11, 1990

[51] Int. Cl.⁵ .............................................. B25G 3/00
[52] U.S. Cl. ........................................ 403/8; 403/20; 403/402; 411/433
[58] Field of Search .................. 403/8, 20, 402; 411/104, 433, 389

[56] References Cited

U.S. PATENT DOCUMENTS

| | | | |
|---|---|---|---|
| 571,042 | 11/1896 | Edquist | 403/8 |
| 1,589,307 | 6/1926 | Svebilius | 411/433 |

FOREIGN PATENT DOCUMENTS

| | | | |
|---|---|---|---|
| 2412597 | 9/1974 | Fed. Rep. of Germany | 403/20 |
| 109797 | 2/1944 | Sweden | 403/402 |

Primary Examiner—Andrew V. Kundrat
Attorney, Agent, or Firm—Charles C. Corbin

[57] ABSTRACT

Bolting apparatus for use with countertop panels and the like of wooden and laminate construction, for securing a first such panel to a second panel, with an edge of the first panel engaging an edge of the second panel, the disclosure including a draw bolt and attached pressure plate members for engaging depressions in the underside of the two panels and the draw bolt spanning the engaging panel edges, the draw bolt being quickly tightenable to draw the engaging panel edges tightly together.

6 Claims, 3 Drawing Sheets

DRAW BOLT APPARATUS FOR COUNTERTOP ASSEMBLAGE

BACKGROUND

1. Field of the Invention

The present invention relates to devices for securing one countertop section to another precut countertop section. More particularly, the present invention relates to quickly operable devices for drawing and bolting one countertop panel to another.

2. Prior Art

In the cabinet making and related industries it is often necessary to assemble a countertop which is typically composed of panels of particle board covered with a protective laminate. This will occur, for example, when a first precut panel with a 45° edge on it must be affixed to a second panel, also with a 45° edge so as to form an L-shaped counter. The conventional way to do this is to employ draw bolts which may be applied to shaped cavities in adjacent edge portions of two panels. These cavities are in the panel underside and each has an enlarged portion and a slot which extends from the enlarged cavity portion to the adjoining panel edge. A first pressure plate is threadedly received on one end portion of the bolt. A nut engages the other end of the bolt to the outside of a second pressure plate with an opening that freely passes the bolt. The prior art illustration of FIG. 2 shows such a conventional device for securing panel P1 to panel P2.

The conventional device 11 is shown to use a threaded bolt 13, threaded pressure plate 15, second plate 17 and hex nut 19. While such devices can be used to effectively secure panels of countertop material there remain drawbacks and limitations which are aggravated by the fact that countertops are typically assembled in-place, requiring the installer to work in a constricted work place since the bolt must be installed to the underside of the countertop. The installer is presented with the task of holding the draw bolt device 11 in place and against gravity, as he tightens nut 19 while simultaneously trying to hold proper alignment of the adjoining panels. The hex nut 19 may be tightened using a conventional wrench, but this is a slow process because the hex nut can be turned only a fraction of a revolution at a time because of limited access of the wrench to the nut. As nut 19 is being tightened, the installer must continually check to insure that the panel tops are kept flush with each other, and one panel must be tapped into alignment with the other when necessary. Thus it will be appreciated that installation can be particularly difficult when only one installer is involved.

SUMMARY OF THE INVENTION

In view of the foregoing it is a general object of the present invention to provide a draw bolt apparatus by which panels of countertop board may be quickly and effectively secured to each other.

Another object of the invention is to provide apparatus that will make it easier for one installer to secure countertop panels.

These and other objects and advantages are provided by the present invention for securing a first countertop section to a second countertop section with the upper surfaces of these sections aligned in the same plane, and the underside of the first panel having at least one shaped cavity therein, each cavity including a generally rectangular part and a slot extending from this rectangular part to the adjoining edge of the panel. The second panel also has a shaped cavity lying opposed from a shaped cavity in the first panel with the slotted portion of one cavity aligned with the slot of a shaped cavity in the second panel. The invented apparatus includes a threaded bolt adapted to be received in the aligned slots of adjacent shaped portions and to extend from the rectangular part of one to the rectangular part of the other. A threaded pressure plate engages one end portion of the bolt and engages a wall of the shaped cavity in which it lies. A nut is received on the other end of the bolt. The invention further features a lock plate having a central hole for receiving the bolt, which hole has a size sufficient to pass the bolt freely When the pressure plate is held at right angles to the axis of the bolt. The fit of the bolt in the lock plate is sufficiently close so that edges of the hole will make binding frictional engagement with the threads of the bolt when the locking plate is forced to tilt substantially on the bolt. The invention further features a pressure block adapted to be received on the other end of the bolt, inwardly of the nut and adapted for being pressed against a wall of the cavity. A central portion of this block is adapted to pass the bolt therethrough and is also adapted to mount and support a lock plate so as to restrain one end of the lock plate against lateral movement while unrestraining the opposite end so that the lock plate is pivotable from a position normal to the bolt to a tilted position. The central portion of the block has an opening for exposing the first side of the lock plate for engagement by means that will forcefully tilt it. The nut is spaced a short distance outwardly of the block.

Finally, the apparatus of the invention includes a handoperated tool with a linkage of pivoting elements including fist and second shaped working ends that normally lie adjacent one another, and which may be urged apart from each other when the tool handle is squeezed. A first working end of the tool is adapted to grasp the nut and the second working end is adapted to be brought into engagement with the unrestrained end of the lock plate. Thus, with the first end of the tool engaging the nut, the second working end can engage the block and urge it away from the nut, pulling the bolt through the block so as to draw together and compress the engaging edges of the panel, and to press and substantially tilt the lock plate into binding frictional engagement with the threads of the bolt. Thus the invention allows adjoining panels to be drawn quickly together in a way that avoids the time-consuming and cumbersome tightening of a nut.

DETAILED DESCRIPTION OF THE INVENTION

Figure 1:
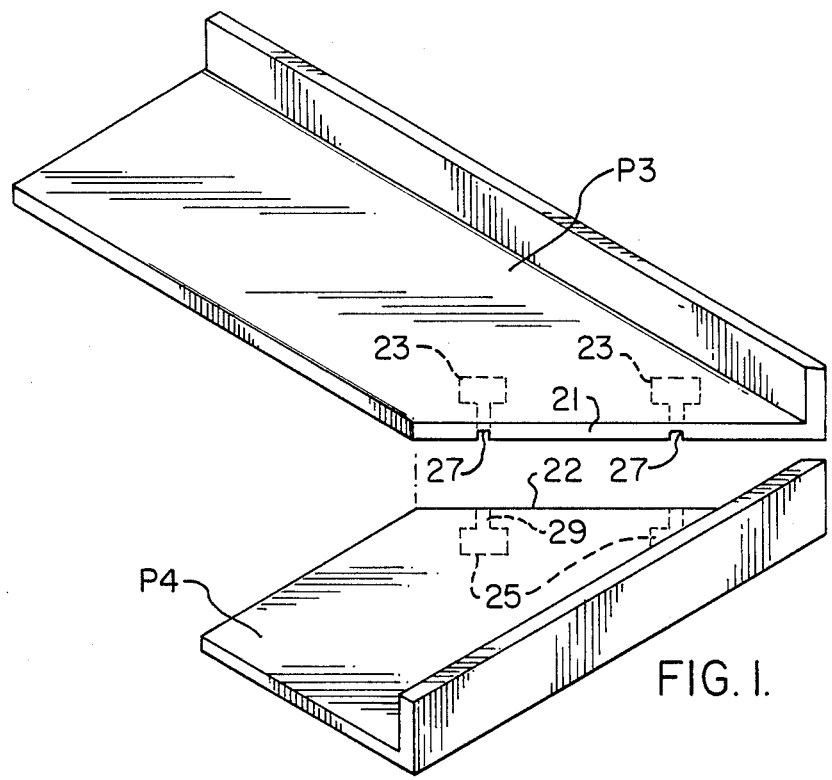
FIG. 1 is a view in perspective of two precut countertop pieces to be secured to each other using the apparatus of the present invention.

Referring now to the drawings, FIG. 1 shows a panel P3 which must be secured to a second panel P4 using a preferred embodiment of the apparatus of the invention, and which panels are made of countertop material which is typically made of particle board with an outer layer of a protective polymeric material. One end of the piece P3 has been cut at 45° to provide an edge 21 and a corresponding cut has been made to piece P4 to provide an edge 22 which will be drawn into engagement with the edge 21 when these two pieces P3 and P4 are joined together using the present invention to form an L-shaped countertop. The underside of piece P3 has at least a pair of precut shaped cavities 23 that are generally rectangular, each shaped cavity 23 being identical and connects with an adjoining edge of a panel by way of a slot of the same depth. FIG. 1 shows that panel P4 also has a pair of shaped cavities 25 which has slots 29 which will be aligned with the slots 27 of cavity 23 when the pieces P3 and P4 are brought together.

Figure 2:
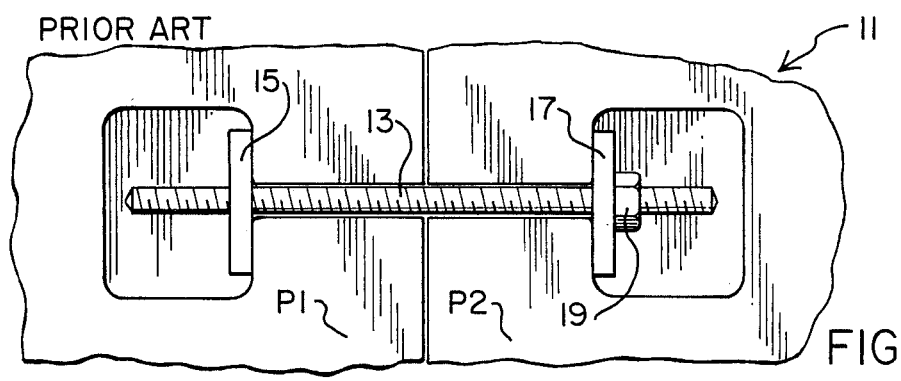
FIG. 2 is a partial plan view illustrating prior art device.
Figure 3:
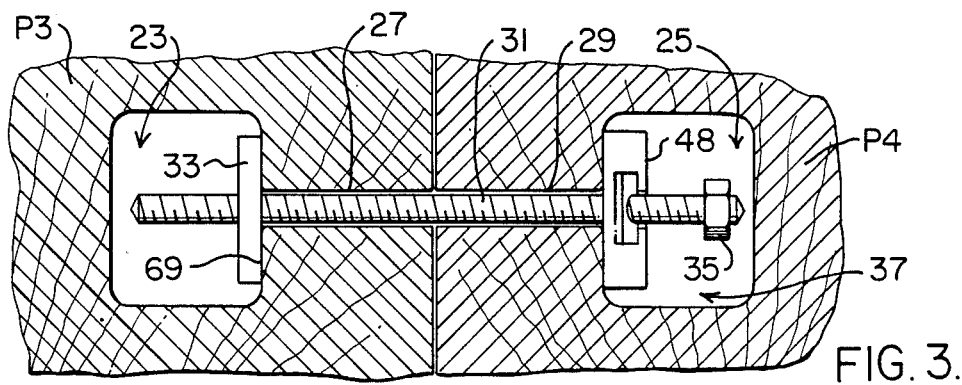
FIG. 3 is a partial sectional view taken along line 3—3 of FIG. 7 illustrating application of a draw bolt according to the present invention.

FIG. 3 shows that a preferred embodiment of the draw bolt device according to the present invention includes a threaded bolt 31, a pressure plate 33 that is threadedly received on one end of bolt 31, a hex nut 35 and a pressure block 37 which engage the other end of bolt 31. The slots 27 and 29 are dimensioned to receive bolt 31, and the cavity 23 is wide and long enough to fit the pressure plate 33 and an extension of the bolt 31. FIG. 2 also illustrates how the cavity 25 will receive the pressure block 37 and an extension of bolt 31.

Figure 4:
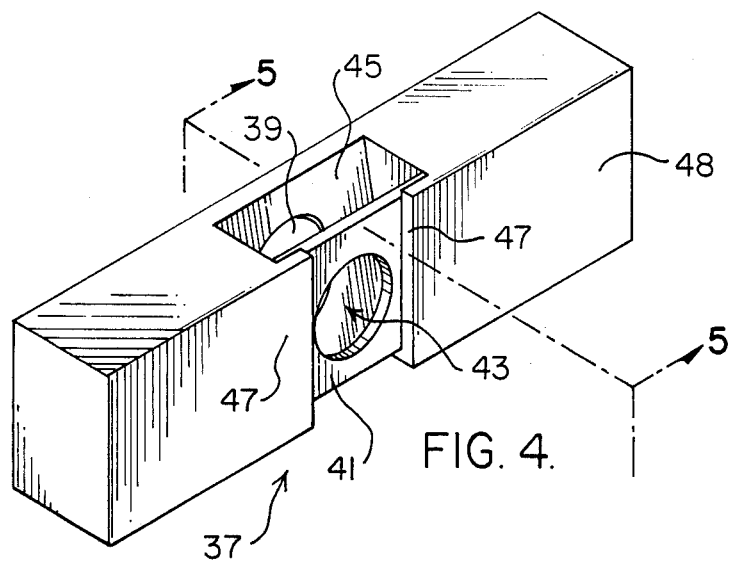
FIG. 4 is a perspective view of a pressure block used in the apparatus of the present invention.
Figure 5:
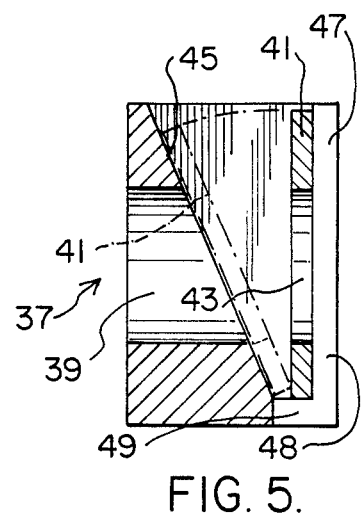
FIG. 5 is a sectional view taken along the line 5—5 of FIG. 4.

The pressure block 37 is fabricated of steel and as FIGS. 4 and 5 show its central portion has a bore 39 which is sufficiently large to pass the threaded bolt 31. The pressure block 37 features a shaped opening in its midportion for receiving and supporting a lock plate 41. The steel lock plate 41 is rectangular and has a hole 43 having a diameter slightly larger than the diameter of threaded bolt 31. The diameter of the opening 43 is selected such that upper and lower edge portions of hole 43 will engage the threads of the bolt 31 when the lock plate 41 is tilted. FIGS. 4 and 5 further illustrate that the pressure block chamber for mounting the block plate 41 has spaced apart sidewalls, a sloped rear wall 45 and an open front bound by front wall portions 47 and a bottom 49. When a lock plate 41 is mounted within block 37, it will be vertically supported at its lower edge by the bottom walls 49 and is free to pivot as suggested in FIG. 5, from an upright position in which it may engage front wall portion 47 and towards a tilted position which will be limited by engagement with the sloped rear wall 45.

Figure 8:
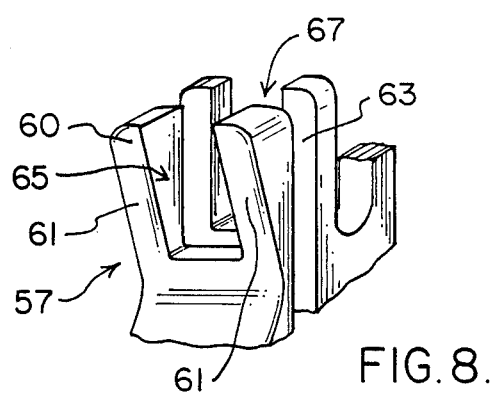
FIG. 8 is a partial perspective view showing the tool ends.
Figure 7:
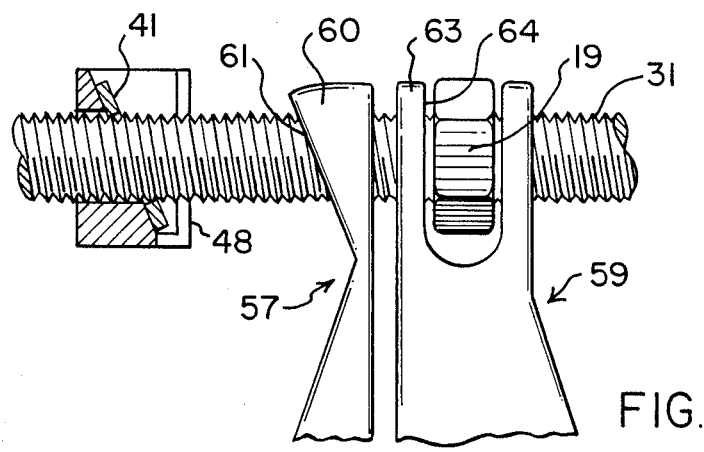
FIG. 7 is an enlarged view illustrating tool application.
Figure 6:
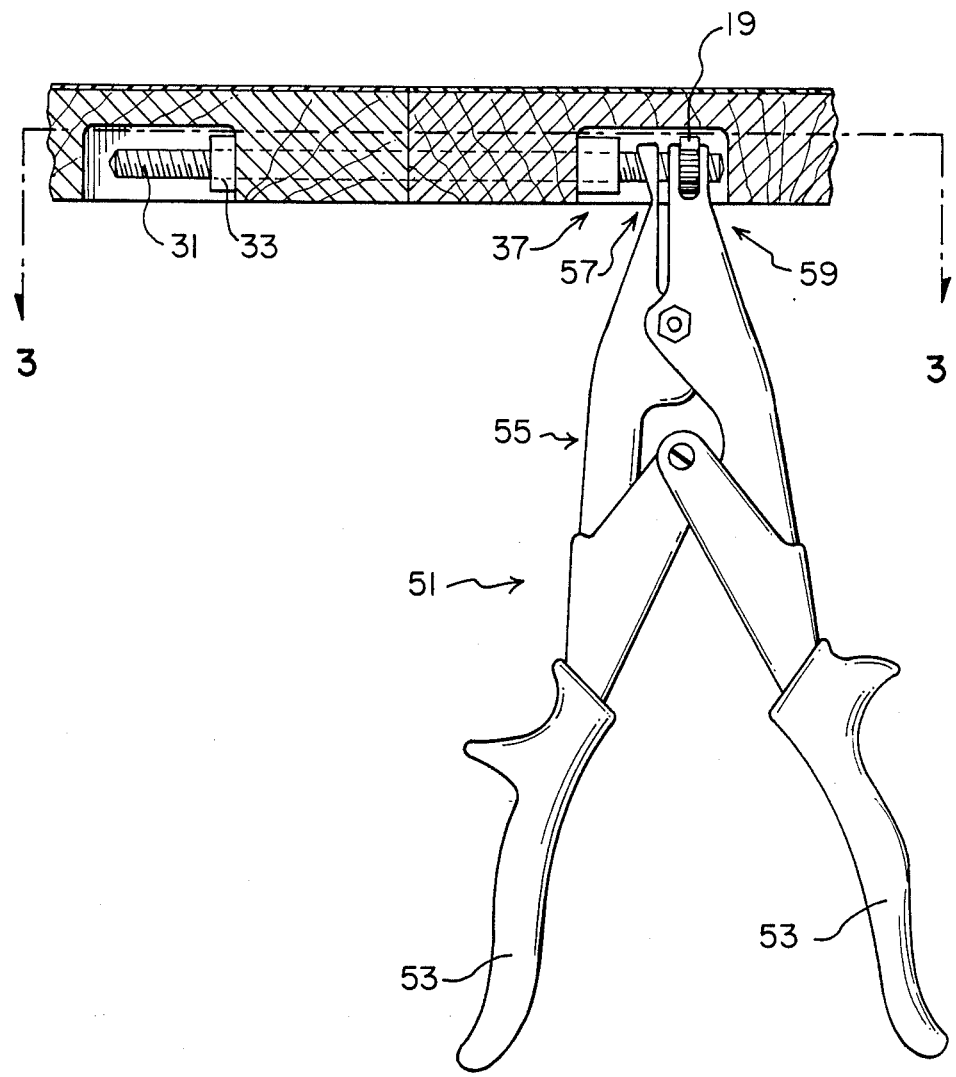
FIG. 6 is a partial, sectional, elevational view illustrating application of the tool of the invention.

FIG. 6 illustrates a preferred embodiment of a hand tool 51 for use with the aforedescribed draw bolt device of the invention, including handles 53, a linkage 55 of pivotally mounted levers, of known design, and specially shaped working ends 57 and 59 which will be caused to spread apart when the handles 53 are squeezed together. The enlarged view of FIG. 7 shows that the first working end 57 features a head 60 with an inclined surface 61, and the second working end 59 includes an element 63 with a flat surface 64. Note in FIG. 8 that the head 60 and the element 63 are provided with upwardly opening slot 65 and 67 respectively which are designed to receive the threaded bolt 31. It is to be noted that the tool head 60 is dimensioned so that it will engage the central opening in the front wall 48 of the pressure block 37 so that the sloped surface 61 can make engagement with the lock plate 41 in a manner to be described hereinafter.

The following will describe how the aforedescribed apparatus may be advantageously employed to secure a panel P3 to a panel P4, shown in FIG. 1, which precut panels are assumed to be partially supported horizontally at a typical countertop distance above a floor by cabinet walls and support structure (not shown). The edge 21 of countertop piece P3 is brought into engagement and preliminary alignment with the edge 22 of countertop 24, with the pair of slots 27 in piece P3 aligned with the slots or channels 29 of the piece P4. The draw bolt device of the invention may then be prepared for application to the shaped cavities of pieces P3 and P4. This is done by first attaching the threaded pressure plate 15 to one end portion of the bolt 13. The other end of the bolt 31 is fed through hole 39 in pressure block 37 and through hole 43 of a lock plate 41. Block 37 is then spaced sufficiently from pressure plate 33 so that plate and block may be placed within cavities 23 and 25. Hex nut 35 is deliberately spaced from the rear wall 48 of block 37. With the draw bolt device manually held in place the tool 51 may then be put to use by bringing its working ends 57 and 59 into engagement with the bolt 31 as illustrated in FIGS. 6 and 7. With tool 51 now upright as shown, the sloped surface 61 of head 60 is aligned opposite a lock plate 41 which lies generally upright with respect to the bolt 31. Tool handles 53 may then be squeezed causing surface 64 of element 63 to press against nut 19 and the sloped surface of head 60 to engage the upper, unrestrained part of the lock plate 41 and to pivot the plate 41 rearwardly towards the inclined wall 45. This will cause the block 37 to be moved rearwardly along the bolt 31. This will have the effect of quickly drawing the pressure plate 33 against the inner walls 69 of cavity 23 and drawing pressure block 37 against inner wall 71 of cavity 25, which in turn presses together adjacent panel edges 21 and 22. Concurrently with the drawing of bolt 31 through opening 43 in tilted lock plate 41, upper and lower edges of the hole 43 will be frictionally forced over the threads of the bolt 31 such that when the tool-exerted pressure on the plate 41 is released it will be firmly locked, in frictional binding engagement with the bolt 31. It is preferable to follow a technique in which an initial amount of clamping is achieved sufficient to hold the countertop pieces together but not too tightly to prevent the pieces to be tapped into final alignment as required. Tool 51 may then be squeezed with an additional amount of force to effect a final tightening. Where two draw bolt devices are used each is partially tightened, followed by alignment of pieces and a final full tightening of each device.

While a particular embodiment of the invention has bene described herein, it is not intended that the invention be limited thereto, since there are modifications and changes that may readily occur to those skilled in the art, without departing from the invention. Therefore it is aimed to cover all such modifications and changes as fall within the true spirit and scope of the invention as defined in the claims which follow.

What is claimed is:

1. Apparatus for securing a first panel of countertop board to a second panel of said countertop board with an edge of first panel engaging an edge of said second panel, with a first shaped cavity in the underside of said first panel lying adjacent a shaped cavity in the underside of said second panel, each said shaped cavities having a large portion and a slot that extends from the large portion to the edge of each said panel, the slot of said first shaped cavity being aligned with the slot of said second panel, said apparatus comprising:

(a) threaded bolt adapted to be received in said aligned slots and to extend from one large cavity portion to an adjoining large cavity portion;

(b) pressure plate adapted to be threadedly received on one end portion of said bolt and for engaging a sidewall portion of said cavity;

(c) nut, threadedly received on the other end portion of said bolt;

(d) lock plate, having a central hole therethrough for receiving said bolt, the size of said hole being sufficient to pass said bolt when said plate is held normally to the axis of said bolt, and wherein edges of said hole make frictional engagement with the threads of said bolt when said lock plate is substantially tilted;

(e) pressure block adapted to be received on the other end of said bolt inwardly of said nut, and having a wall for abutting a sidewall of the large cavity portion in which said block is located, and the central portion of said block adapted to pass said bolt therethrough and to mount and support said lock plate with one of its ends restrained and the opposite end unrestrained against inward movement, so that said lock plate is tiltable from a position normal to said bolt to a position substantially tilted thereto, and said central portion having an opening for exposing a first face of said lock plate;

(f) hand-operated tool means with a pair of handle-equipped pivoting levers that operatively connect to first and second shaped working ends of said tool so as to be urgable apart from each other when said handles are squeezed, said first shaped working end adapted to engage said nut and said second working end being shaped and adapted to be brought in engagement with said first face of said lock plate and the unrestrained end thereof; and (g) whereby said tool is operable to urge said nut away from said block so that said pressure plate and said block engage respective ones of said cavity walls to draw said engaging panel edges tightly together and to substantially tilt said lock plate into binding frictional engagement with the threads of said bolt.

2. Apparatus as defined in claim 1 wherein said pressure plate, block and lock plate are generally rectangular.

3. Apparatus as defined in claim 2 wherein said central portion of said block restrains the lower edge of said lock plate against movement in the direction of the axis of said bolt.

4. Apparatus as defined in claim 3 wherein said block's central portion has a cavity shaped to receive said lock plate, said cavity having a generally V-shaped cross sectional configuration with a generally vertical wall and a substantially sloped wall for being engaged by said lock plate to limit its rotation about its restrained edge.

5. Apparatus as defined in claim 4 wherein said generally vertical wall of said plate-receiving cavity has an opening for passing said second shaped working tool end.

6. Apparatus as defined in claim 1 wherein said second shaped working end has a surface for engaging said lock plate and which surface is sloped with respect to said bolt.

* * * * *